US011411598B2

(12) United States Patent
Chiummiento et al.

(10) Patent No.: US 11,411,598 B2
(45) Date of Patent: Aug. 9, 2022

(54) ELECTRICAL PHASE COMPUTATION USING RF MEDIA

(71) Applicant: Itron Global SARL, Liberty Lake, WA (US)

(72) Inventors: Philippe Chiummiento, Fontenay-aux-Roses (FR); Matthieu Pichot, Paris (FR); Guillaume Descamps, Paris (FR); Fabrice Monier, Bry sur Marne (FR)

(73) Assignee: Itron Global SARL, Liberty Lake, WA (US)

( * ) Notice: Subject to any disclaimer, the term of this patent is extended or adjusted under 35 U.S.C. 154(b) by 0 days.

(21) Appl. No.: 16/425,626

(22) Filed: May 29, 2019

(65) Prior Publication Data

US 2020/0382155 A1    Dec. 3, 2020

(51) Int. Cl.
*H04B 3/54* (2006.01)
*H04B 1/7073* (2011.01)
*H04W 72/04* (2009.01)
*H04L 7/033* (2006.01)
*H04W 4/38* (2018.01)
*H04Q 9/00* (2006.01)
*H04L 7/00* (2006.01)

(52) U.S. Cl.
CPC ......... *H04B 1/7073* (2013.01); *H04L 7/0087* (2013.01); *H04L 7/0331* (2013.01); *H04Q 9/00* (2013.01); *H04W 4/38* (2018.02); *H04W 72/0446* (2013.01); *H04B 2201/709718* (2013.01); *H04Q 2209/60* (2013.01)

(58) Field of Classification Search
None
See application file for complete search history.

(56) References Cited

U.S. PATENT DOCUMENTS

| | | | |
|---|---|---|---|
| 9,791,485 B2 | 10/2017 | Flammer, III et al. | |
| 2007/0247139 A1* | 10/2007 | Veroni | G01R 29/18 324/84 |
| 2008/0116877 A1* | 5/2008 | Giubbini | G01R 29/18 324/84 |
| 2013/0106616 A1* | 5/2013 | Gustafsson | H04Q 9/00 340/870.02 |
| 2013/0110425 A1* | 5/2013 | Sharma | H02J 13/00034 702/62 |
| 2015/0253367 A1* | 9/2015 | Flammer, III | H02J 3/00 324/76.77 |

* cited by examiner

*Primary Examiner* — Curtis A Kuntz
*Assistant Examiner* — Jerold B Murphy
(74) *Attorney, Agent, or Firm* — Lee & Hayes, P.C.

(57) ABSTRACT

Techniques for computing electrical phase of electrical metering devices are described. In an example, data indicating zero-crossing times at first and second metering devices is obtained. A time-difference between the zero-crossing times may be determined. In a first example, the time-difference may be based at least in part on calculations involving a first value of a first free-run timer on a first metering device, a second value of a second free-run timer on a second metering device, and a time of a transmission between the metering devices. In a second example, the time-difference may be based at least in part on calculations involving a start or end time of a time-slot of a spread spectrum radio frequency transmission scheme. A phase difference between the first zero-crossing and the second zero-crossing may be determined, based at least in part on the determined time-difference.

20 Claims, 9 Drawing Sheets

ELECTRICAL PHASE COMPUTATION USING RF MEDIA

BACKGROUND

The smart electrical grid includes aspects of energy and data, which provide electrical service to millions of consumers. Each consumer is connected to a smart metering device, which may constitute a network node within the smart electrical grid. Each smart metering device is connected to a transformer, which lowers the voltage (e.g., medium-voltage) supplied by a substation to a voltage (e.g., low-voltage) used by the consumer. Each of the three phases of the medium-voltage current are typically connected to different transformers. Alternatively, the three phases may be connected to a three-phase transformer, which is logically similar to three single-phase transformers. For a variety of reasons, such as balancing the load carried by each of the three phases, it is important to know the phase attached to each transformer.

Each smart metering device is able to communicate with other such devices, which are connected to the same transformer, using powerline communications techniques. However, the use of powerline communications to communicate with devices not connected to the same transformer involves technical challenges. Accordingly, powerline communications between meters used to determine a differential electrical phase of such meters, and their associated transformer, is problematic.

Solutions to the phase-identification problem using radio frequency (RF) techniques are also problematic. In an example, the physical layer (e.g., as defined by IEEE standards) does not support specific information related to electrical phase.

In a further example, zero-crossings values (i.e., an event wherein alternating current (AC) voltage provided to a customer crosses from negative to positive voltage) detected at different meters may be time-stamped and compared. The time-stamps may indicate that the AC voltage provided to different meters has zero crossings that are temporally similar, or 120-degrees leading or lagging. In other examples, the voltages of different phases can be 30, 60, 90, 120, 150 and/or 180 degrees leading or lagging a particular voltage on a particular conductor. In still further examples, the number of phases may be one, two, three or many. Accordingly, the relative phases of the voltage (e.g., of three-phase power) at different meters may be determined. However, variance among clocks onboard respective metering devices may render determination of phase to be inaccurate and/or uncertain. Additionally, correcting the variance among clocks may involve considerable overhead.

To correct clock variance, smart metering devices may share clock information, allowing for each meter to determine variance with other meters' clocks, and adjust the zero-crossing time of other meter(s) accordingly. However, considerable overhead is involved in such processes. Additionally, data-transmission latency within networks tends to make such shared clock information erroneous.

Accordingly, both powerline and RF communication-based designs have unresolved problems, and improved systems and techniques are needed to allow such communication.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes techniques for computation of electrical phase using radio frequency (RF) media. In an example, data indicating zero-crossing times at first and second metering devices is obtained. The data may be generated at least in part by meteorology units of the metering devices. A time-difference between the zero-crossing times may be determined. The time-difference may be used to determine a phase-difference (if any) of the metering devices.

A first example of time-stamping, a time-difference between zero crossings is based on free-run timers. In the example, the free-run timers measure time (e.g., in the manner of a stopwatch), but are not required to maintain accurate time-of-day value. Accordingly, the use of free-run timers overcomes difficulties introduced by the time-drift and maintenance required by clocks. The time-difference between zero-crossings may be based at least in part on calculations involving a first value of a first free-run timer on a first metering device, a second value of a second free-run timer on a second metering device, and a time of a transmission between the metering devices. In the example, on each of two network nodes, the free-run timer may time a period that starts with a zero-crossing event at that node and ends with transmission or reception of a packet. In an example, the period may be determined by subtracting an initial value of the free-run timer from a final value of the free-run timer. The packet may share one network node's timer value with another network node. In a further example, reception of a particular portion (e.g., the header) of the packet may be used as end of the timing period that started at a zero-crossing. A phase difference between the first zero-crossing and the second zero-crossing may be determined, based at least in part on the determined time-difference. E.g., in a 60 Hz grid, a time difference of $1/180$ of a second may indicate a 120-degree offset in phases.

A second example of time-stamping, the time-difference between zero-crossings may be based at least in part on calculations involving a start or end time of a time-slot of a spread spectrum radio frequency transmission scheme. In a spread spectrum environment, RF devices employ frequency-hopping techniques to communicate for short periods of time on a series of frequencies. At appointed times, signal transmission and reception move to a different frequency. In the second example, the appointed times may be used as a signal to start (or end) a time period ending (or beginning) at a zero-crossing event. As in the above example, the time-periods by which zero-crossings are offset may be used to determine a phase difference. Accordingly, hardware configured to maintain and govern the frequency-hopping of the spread spectrum may additionally assist in determining time-differences of zero-crossings at different metering devices.

Example System and Techniques

Figure 1:
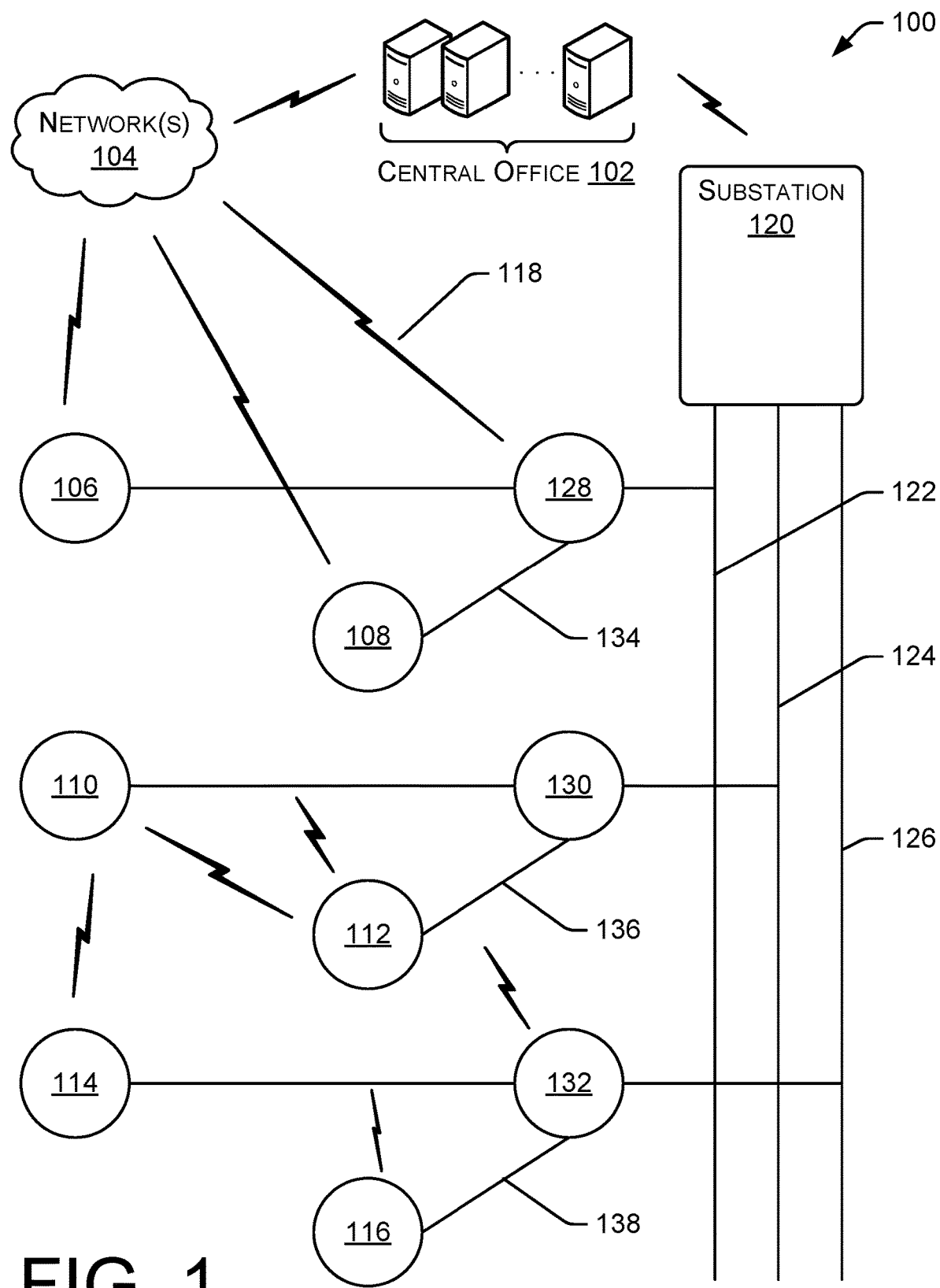
FIG. 1 is a diagram showing a smart electrical grid configured with network nodes having meteorology units, processors, control techniques and devices for electrical phase determination and network topology mapping.

FIG. 1 shows a smart electrical grid 100 configured with network nodes having meteorology units, processors, timers, and/or control techniques and devices for electrical phase computation and network topology mapping. In the example of FIG. 1, a central office 102 is in communication with one or more networks 104 to provide (typically two-way) communications with a plurality of network nodes (e.g., network nodes 106-116). In the example shown, RF communication 118 is shown. However, in some instances other communications technologies, such as powerline communications, fiber optics, etc., could be utilized for some or all of the communications.

The network nodes 106-116 may be electricity meters, configured to measure electrical consumption of an associated customer. The network nodes 106-116 may be part of a network having characteristics of a mesh and/or star RF network, and may utilize RF techniques 118 to transmit and/or receive data, which may be in the form of packets. The network 104 allows the electricity meters to report electrical consumption data to the central office 102. Additionally, the network 104 allows the central office 102 to provide software updates, commands, and data to some or all of the nodes 106-116.

A substation 120 may provide electrical power over medium voltage lines 122-126. The medium voltage lines may be configured as three-phase power, with each phase 120-degrees out of phase with the other two phases. Accordingly, the three phases would have zero-crossing times that are 120-degrees out of phase with the other two phases.

Transformers 128-132 input one of the medium voltage lines 122-126, respectively. Each transformer provides low voltage (e.g., 120 volts AC) to one or more electricity meters associated with respective customers. For example, transformer 128 inputs the medium voltage having phase 122 and outputs power to network nodes 108 using low voltage lines 134. Similarly, transformers 130, 132 provide nodes 112, 116 with energy using low-voltage lines 136, 138. In the example, network nodes 106-116 may be smart electricity meters, each associated with a respective customer.

Figure 2A:
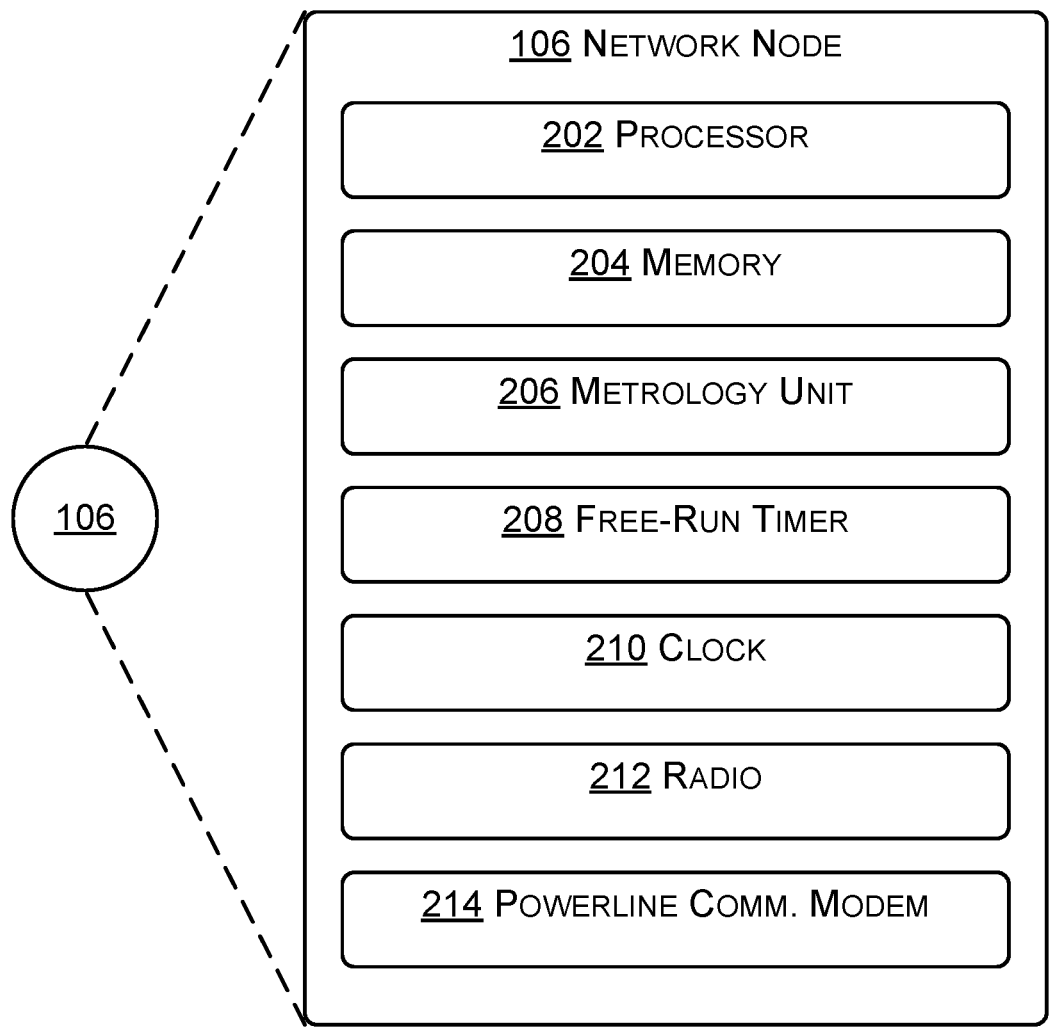
FIG. 2A is a block diagram showing example configuration of a network node that has been configured as a smart electricity metering device.

FIG. 2A shows an example configuration of a network node 106 that has been configured as a smart electricity metering device. In the example, a processor 202 is able to exchange data with a memory device 204, allowing for program execution and data processing. A meteorology unit 206 measures electricity consumption of a customer, zero-crossings and may perform other functions. A free-run timer 208 is configured to measure time since an event and/or perform other timer functions. A clock 210 is configured to provide time of day, date and other functions. A radio 212 provides (typically two-way) radio communications within a network. Referring to FIG. 1, the networks 104 may include RF mesh and/or star (e.g., hub and spoke) configurations. The RF communications allow the node 106 to report electricity consumption data, obtain software updates, respond to commands, and other functions. In some examples, the node 106 may include a powerline communications modem 214. The powerline communications modem may provide communications between network nodes, particularly if RF communications are unavailable.

Figure 2B:
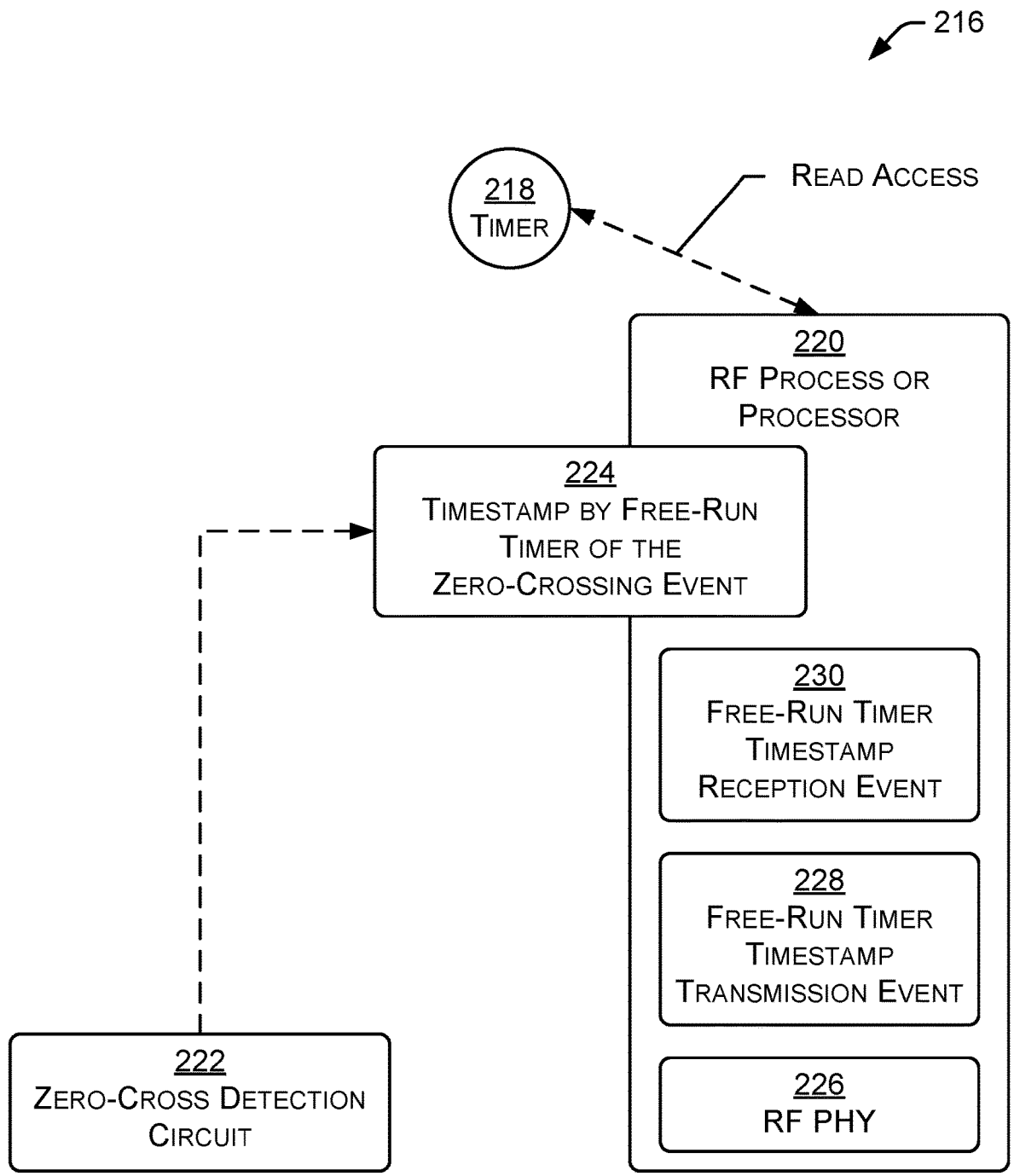
FIG. 2B is a block diagram showing a second example configuration of a network node that has been configured as a smart electricity metering device.

FIG. 2B shows example portions of a network node 216. In the example, a timer 218 may be configured as a free-run timer, which measures time between a start and a stop signal. The timer may have 64-bit 1 microsecond resolution. An RF process (e.g., software running on a generic processor to perform RF functions) or dedicated RF processor 220 may be in communication with the timer 218. A zero-crossing detection circuit or device 222 may be part of a meteorology unit or a stand-alone device. The zero-crossing device 222 may communicate with the timer 218 directly or through the processor 220. In the example shown, a zero-crossing signal is sent to the timer 218 by the processor 220 to indicate that a value of the free-run timer is required. A timestamp 224 of a zero-crossing event may be configured using the value of the free-run timer. The timer may be read again, responsive to a start or an end of a timeslot used in the RF transmission of packets according to spread spectrum techniques. In an example, the zero-crossing event may be processed at the RF PHY level 226. A free-run timer timestamp transmission event 228 may result if the timestamp 224 is transmitted to a node or upstream data collector, headend, server or other device. A free-run timer timestamp reception event and/or data 230 may result if a timestamp is received from another network node or metering device.

Figure 2C:
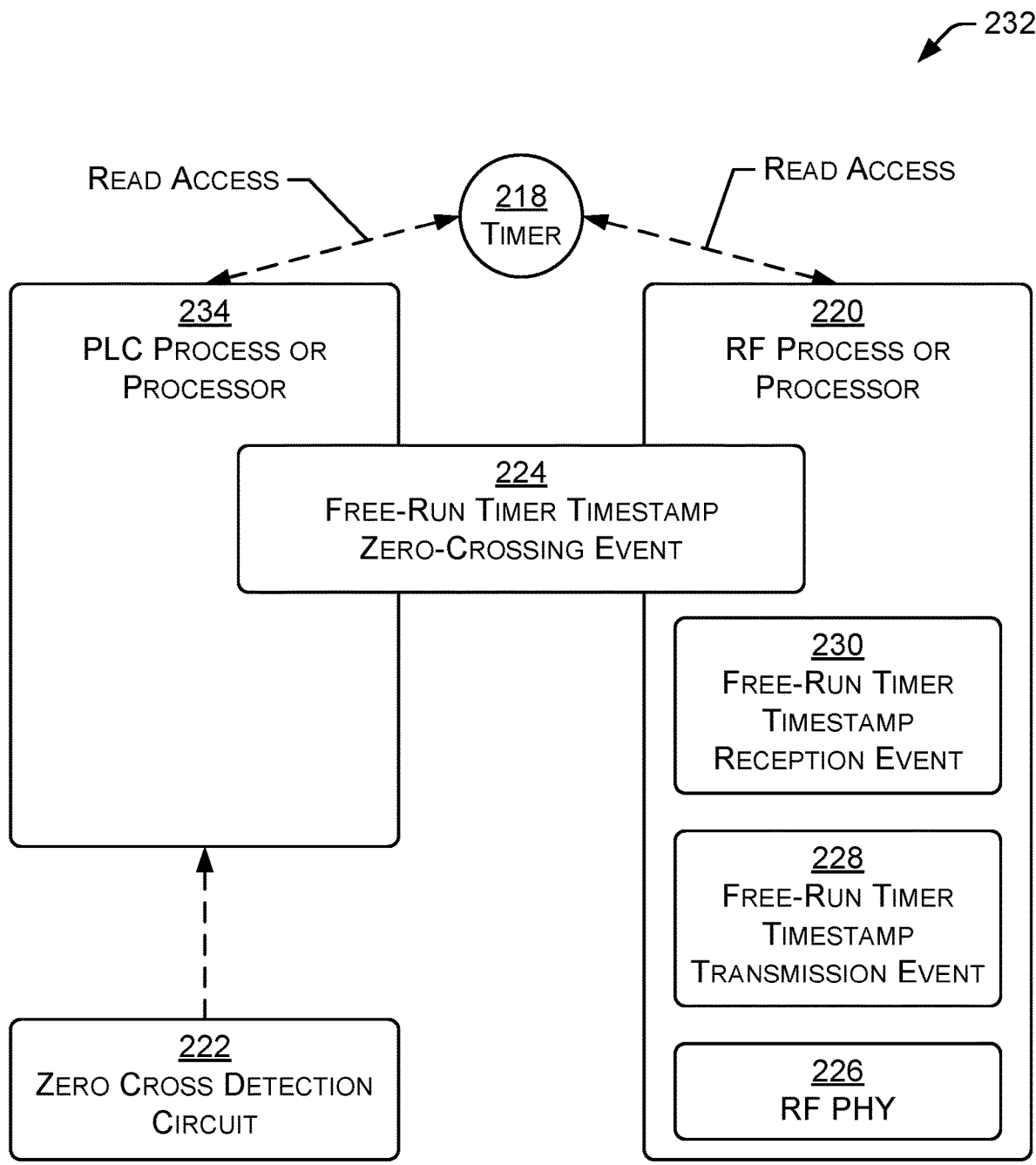
FIG. 2C is a block diagram showing a third example configuration of a network node that has been configured as a smart electricity metering device.

FIG. 2C shows example portions 232 of a network node. In the example, a powerline communication (PLC) process or processor 234 may be in communication with the timer 218. The PLC process may be software running on a generic processor to perform PLC functions, while a PLC processor may be configured within a PLC modem. The PLC modem may receive the zero-crossing signal from the detection circuit 222, and may transfer the signal to the RF process or processor 220.

Figure 3:
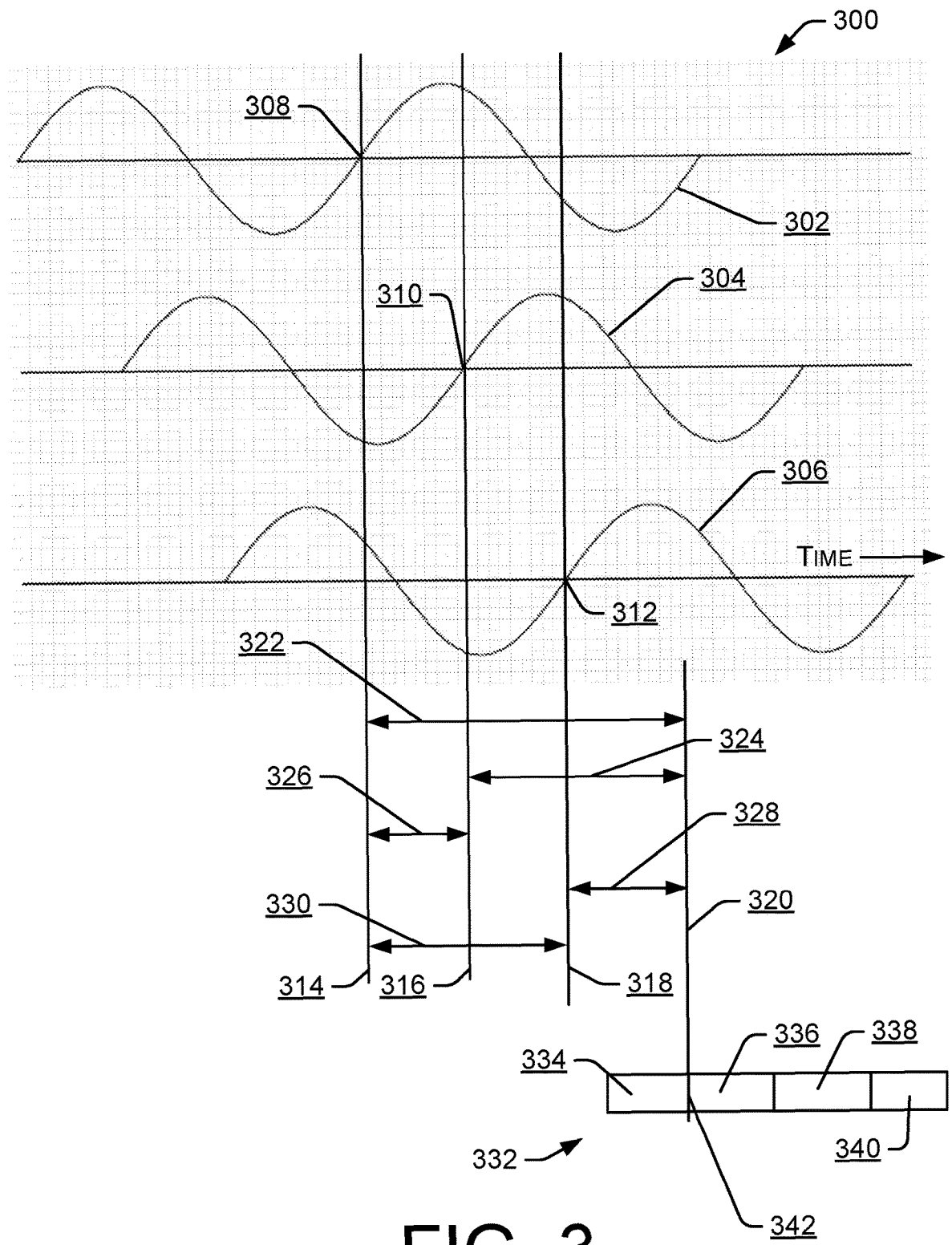
FIG. 3 is a timing diagram showing a first example technique to determine electrical phase differences between nodes on the smart electrical grid.

FIG. 3 is a timing diagram showing a first example of techniques 300 to determine electrical phase differences between nodes on the smart electrical grid. In an example, the techniques 300 allow network nodes 106, 110, 114 (seen in FIG. 1) to determine that all are connected to different phases 122, 124, 126 of three-phase power, respectively. In a further example, the techniques 300 allow network nodes 106, 108 (seen in FIG. 1) to determined that they are connected to a same phase of three-phase power. If one of the phases of one of the network nodes is known (such as by inspection), the phases to which other nodes may be determined as the same phase, a leading phase, or a lagging phase.

FIG. 3 shows voltage phase representations 302, 304, 306 of the voltages of the low-voltage lines 134, 136, 138 (seen in FIG. 1). A zero-crossing of each phase 302, 304, 306 may be defined as the negative-to-positive transition 308, 310, 312 through zero volts. Thus, each voltage phase representation 302-306 shows how voltage varies with time as a sine wave, alternating between positive and negative values, and crosses the zero-voltage line in the negative-to-positive direction once per cycle.

The zero-crossing events 308, 310, 312 are represented by times 314, 316, 318, respectively. At time 314 a first network node (e.g., node 106 of FIG. 1) generates and/or receives a signal indicating that the power line to which it is connected has encountered a zero-crossing event. The zero-crossing event may be recognized by the meteorology unit 206 of the node 106. A free-run timer on the node (e.g. free-run timer 208, seen in FIG. 2) may begin to measure time. The free-run timer may operate from time 314 until a time 320, at which time a packet 332 is transmitted by the network node 106. Accordingly, the time period measured by the free-run timer is represented by line 322, i.e., the time 314 of the zero-crossing 308 at the node 106 until the node sends an RF packet 332 at time 320.

In an example, the first node 106 may send the packet 332 according to a modulation scheme and defined by an RF signal. The packet may include a preamble 334, a packet header 336, data and/or information elements 338, and/or a MAC PDU 340. The packet may contain the value (e.g., an expression of time 322) of the free-run timer at the time of transmission of the packet. In some examples, the time value sent in the packet may represent the time of transmission not just of the packet, but the time of transmission of some part of the packet.

Similarly, a second node (e.g., node 110 of FIG. 1) recognizes its own zero-crossing 310 at time 316. Responsive to the zero-crossing, the second node reads a value of a free-run timer. Reading the free-run timer provides data to time the period 324 from the time 316 (of the zero-crossing 310) until detection/reception of the packet 332 at time 320. The packet 332 may be considered to be a synchronization beacon.

Therefore, the time period 322 represents the time from the first node's zero-crossing until transmission of a packet to the second node. The time period 324 represents the time from the second node's zero-crossing until reception of the packet at time 320 by the second node. If the transmission and reception times are considered to be the same, then the time period 324 may be subtracted from the time period 322 (obtained by the second node from the packet 332 sent by the first node) to yield the time period 326. The time period 326 shows the difference in the phase of power supplied to the two nodes. In the example shown, the time period 326 indicates that the zero-crossing 308 leads the zero-crossing 310 by 120-degrees.

Similarly, a third node recognizes its own zero-crossing 312 at time 318. Responsive to the zero-crossing, the node reads a free-run timer. The free-run timer provides data to time the period 328 from the time 318 of the zero-crossing 312 until detection/reception of the packet 332 at time 320.

Therefore, the time period 322 represents the time from the first node's zero-crossing until transmission and/or reception of a packet at time 320, which includes data representing the duration of the time period 322. The time period 328 represents the time from the third node's zero-crossing until reception of the packet at time 320 by the third node. If the transmission and reception times are considered to be the same, then the time period 328 may be subtracted from the time period 322 (obtained from the packet 332 sent by the first node) to yield the time period 330. The time period 330 shows the difference in the phase of power supplied to the two nodes. In the example shown, the time period 330 indicates that the zero-crossing 308 leads the zero-crossing 312 by 240-degrees (which is the same as lagging by 120 degrees).

Accordingly, if two (or more) nodes read free-run timers after their own zero-crossing events, and if one (or more) nodes sends a transmission that includes the value of its free-run timer at the time of transmission, and if the time of transmission and reception are essentially the same, then the second node receiving the transmission and obtaining the value of the free-run timer of the first node can determine a phase difference between the nodes.

The time of transmission and/or reception of the packet may be based on the start, middle or end of the packet 332. In an example, the time of transmission may be set at a point 342 in the packet, such as the beginning of the packet header 336, or the beginning of the data portion 338 of the packet, etc. Accordingly, the time of transmission can be determined by a small amount of data within a longer packet.

Figure 4:
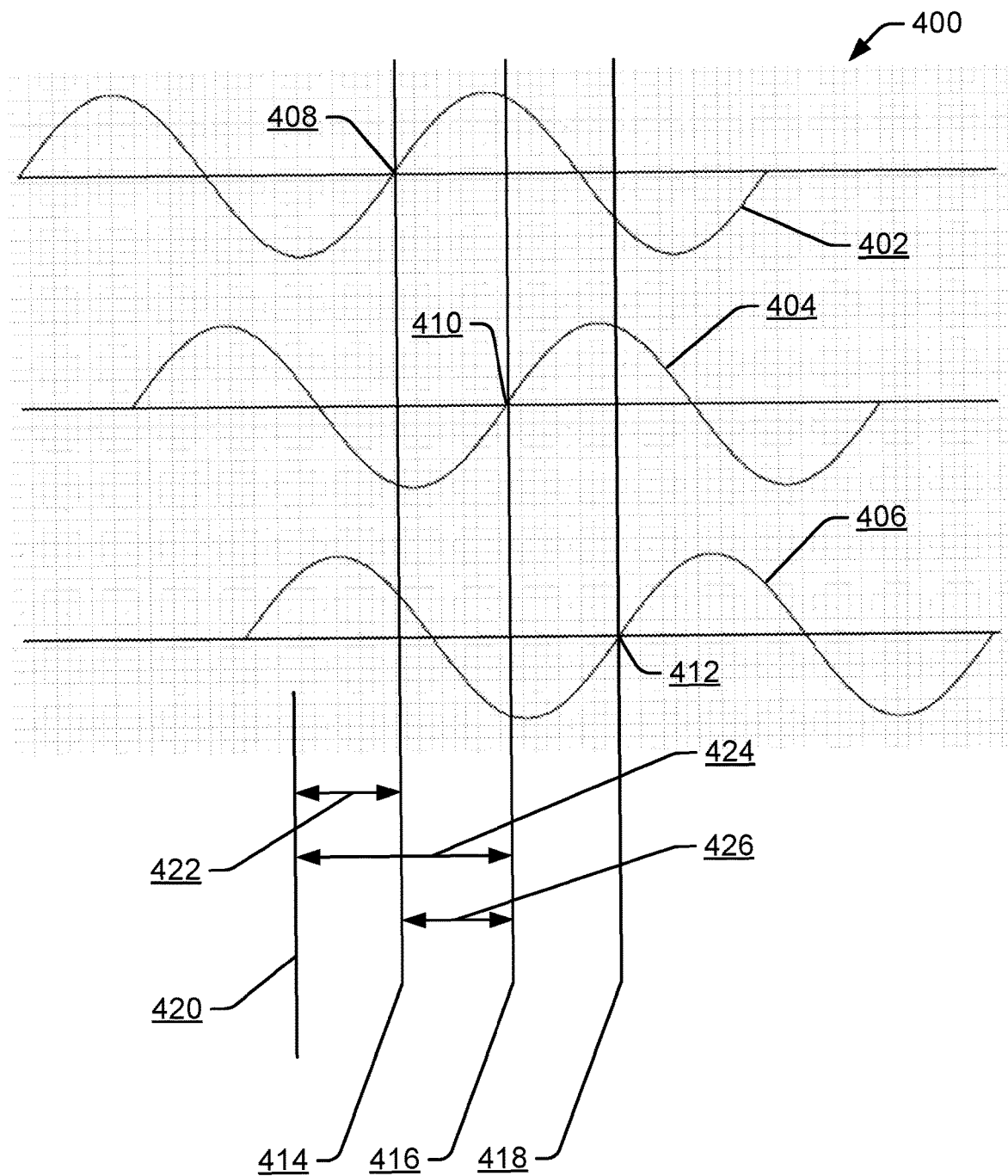
FIG. 4 is a timing diagram showing a second example technique to determine electrical phase differences between nodes on the smart electrical grid.

FIG. 4 is a timing diagram showing a second example of techniques 400 to determine electrical phase differences between nodes on the smart electrical grid. In an example, the techniques 400 allow network nodes 106, 110, 114 (seen in FIG. 1) to determine that all are connected to different phases 122, 124, 126 of three-phase power, respectively. In a further example, the techniques 400 allow network nodes 106, 108 (seen in FIG. 1) to determined that they are connected to a same phase of three-phase power. If one of the phases of one of the network nodes is known (such as by inspection), the phases to which other nodes may be determined as the same phase, a leading phase, or a lagging phase.

FIG. 4 shows voltage phase representations 402, 404, 406 of the voltages of the low-voltage lines 134, 136, 138 (seen in FIG. 1). A zero-crossing of each phase 402, 404, 406 may be defined as the negative-to-positive transition 408, 410, 412 through zero volts. Thus, each voltage phase representation 402-406 shows how voltage varies with time as a sine wave, alternating between positive and negative values, and crosses the zero-voltage line in the negative-to-positive direction once per cycle. The zero-crossings 408, 410, 412 are represented by times 414, 416, 418, respectively.

In an example of a spread spectrum RF network, a plurality of time-slots is defined. At each time-slot, transmission/reception moves to a different frequency. The time 420 represents the end of one time-slot and the beginning of another time-slot. Responsive to the start of a timeslot 420, two or more of the nodes 106-116 (as seen in FIG. 1) may read their respective free-run timers. Accordingly, the value of each timer represents the time since the time-slot.

Each node will have a series of zero-crossing events. Responsive to its own zero-crossing event, each node may stop its respective free-run timer. Accordingly, each timer will have been read (i.e., a value obtained from the timer) at the same time, responsive to the start of a time-slot, and ended responsive the zero-crossing event of that node. (This may be reversed, if desired.) The difference among timers can be used to determine if two nodes are connected to a same phase of power, of if one node's phase leads or lags the other node.

Also responsive to a zero-crossing event, a node may enter the value of its free-run timer into a packet and transmit the packet to nodes in the area and/or to the central office 102 or other facility. The value of the free-run timer may be used by other nodes, which compare their free-run timer values to the received timer value. The comparison shows the receiving node if the transmitting node uses a phase that leads, lags or is the same as that of the receiving node.

In the example of FIG. 4, the time slot begins at time 420. A first node has a zero-crossing event 408 at time 414 and stops its timer with an elapsed time 422. A second node has a zero-crossing event 410 at time 416 and stops its timer with an elapsed time 424. The difference between times 422 and 424 is the time 426. The time period 426 shows that the second node is connected to a phase that lags the phase of the first node by 120-degrees.

In a manner similar to that described with respect to FIG. 3, either node may send the other node its timed value. For example, the first node may send it timed value 422 to the second node. With its own timed value 424, and the timed value 422 of the first node, the second node is able to calculate the difference 426 between times 416, 416 of zero-crossings 408, 410. That is, the second node is able to subtract elapsed time 422 from elapsed time 424 to get elapsed time 426. Moreover, if both the first and second nodes send their timed values 422, 424 to a central office, the central office will be able to calculate the time 426 between zero-crossings 408, 410.

The cycles per second of the electrical grid is known (e.g., 60 Hz). Accordingly, the time difference can easily be translated to a percentage of a cycle (e.g., zero-crossing 410 lags zero-crossing 408 by 120-degrees).

Accordingly, the techniques 300 and 400 of FIGS. 3 and 4 show example methods by which a time-difference and a phase-difference between two nodes may be determined.

Example Methods

In some examples of the techniques discusses herein, the methods of operation may be performed by one or more application specific integrated circuits (ASIC) or may be performed by a general-purpose processor utilizing software defined in computer-readable media. In the examples and techniques discussed herein, the memory 204 may comprise computer-readable media and may take the form of volatile memory, such as random-access memory (RAM) and/or non-volatile memory, such as read only memory (ROM) or flash memory. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 5:
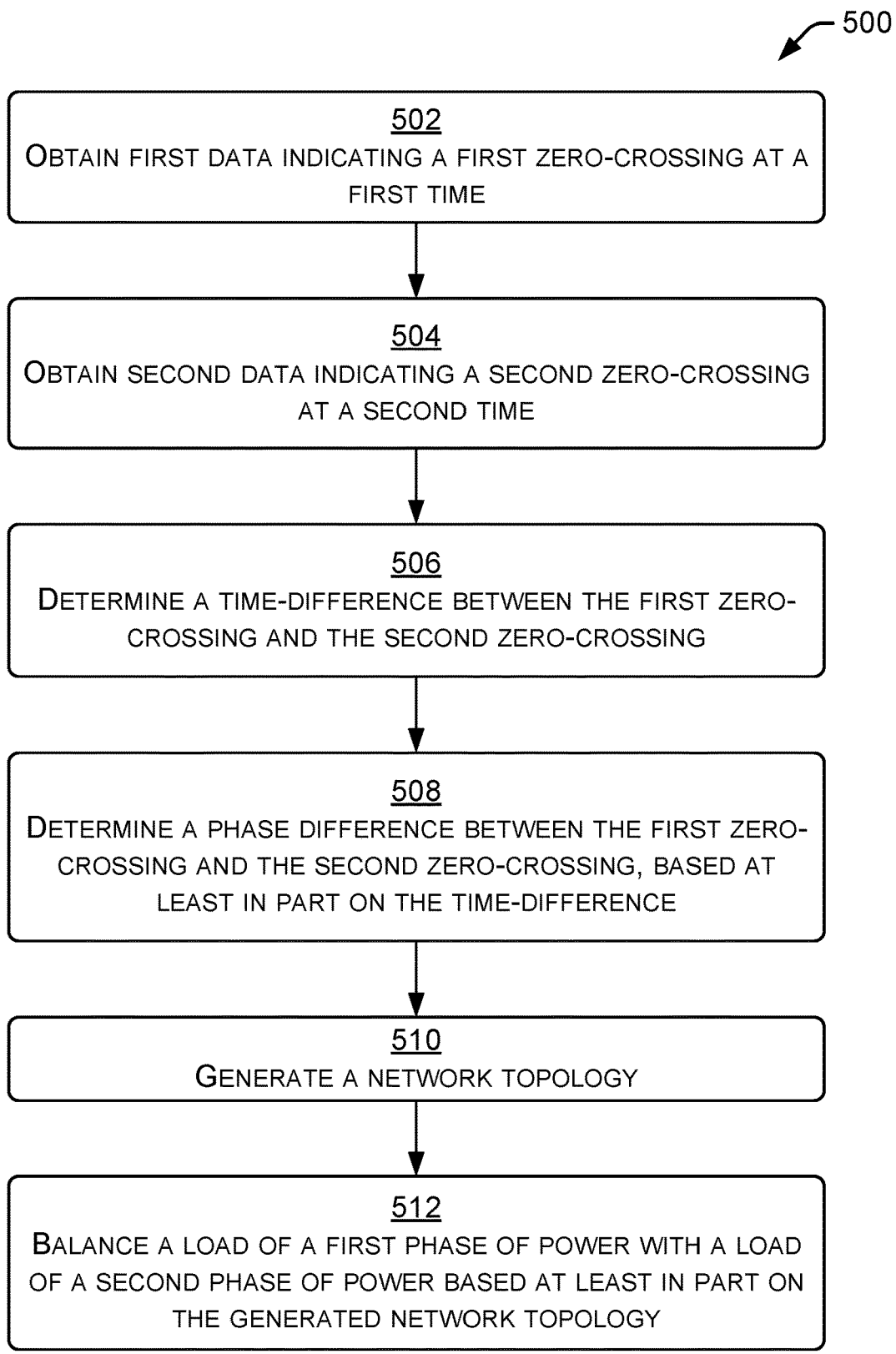
FIG. 5 is a flowchart showing example techniques by which zero-crossing times may be obtained, time-differences between the zero-crossing times may be calculated, and phases to which each node is attached may be determined.

FIG. 5 shows example processes for electrical phase computation using RF media. The processes may, but need not necessarily, be implemented in whole or in part by the smart electrical grid 100 (e.g., as seen in FIG. 1) and/or one or more network nodes 106 (e.g., as seen in FIG. 2).

FIG. 5 shows example techniques 500 by which zero-crossing times may be obtained for two or more nodes or metering devices. Time differences between the zero-crossing times may be calculated. The time-differences may be used to determine phases to which each node is attached. The phases may be used to generate a network record of the topology of the smart grid. Using the topology, load balancing and other smart grid functions are more accurately and efficiently performed.

At block 502, data is obtained indicating a first zero-crossing time. At block 504, data is obtained indicating a second zero-crossing time. Referring to the example of FIG. 1, nodes 106-116 are connected to different phases 122-126 of electricity. Referring to the example of FIG. 2, the meteorology unit 206 is configured to obtain zero-crossing times for the phase attached to the metering device or node 106. Referring to FIGS. 3 and 4, the zero-crossing times are indicated by the voltage crossing through zero volts from negative to positive, which is seen at 308-312 in FIGS. 3 and 408-412 in FIG. 4. The zero-crossing times may be accurate to 1 millisecond or less. Accordingly, electrical phase differences of 120-degrees that are separated by $1/180^{th}$ of a second may be distinguished, and electrical phase differences of 30-degrees that are separated by $1/720^{th}$ of a second may be distinguished. In an example, the techniques 500 may be utilized to configure a node (e.g., node 106 of FIG. 2A) to be able to distinguish phases separated by 15-degrees at 50 and/or 60 Hertz.

Referring to FIGS. 2B and 2C, the zero-crossing time information, signal and/or timestamp may spend some time moving through one or more of the PLC processor 234, the RF process or processor 220, one or more network layers, such as the RF PHY layer 226, and other hardware and/or software devices. Accordingly, there may be latency or delay between obtaining the timestamp and its active utility to the network node. However, based at least in part on experience using a particular node, the time required for the timestamp to propagate through the layers and devices may be determined. Once known, the time of the timestamp may be adjusted, or other adjustments performed, to compensate for the delay or latency. As a result, some references to timestamps may refer to an "adjusted timestamp," which has been adjusted to remove such unwanted latency and/or to indicate a point within a packet with which the timestamp is associated. In an example, where two timestamps are being compared, compensation should be made for differing periods of latency, to increase the accuracy of the comparison.

The adjustments to remove and/or quantify latency may be more critical if higher layers in the model of computer networking are used to perform timestamping operations. Depending on which layer was involved in a timestamping operation, e.g., the MAC layer or the PHY layer, a different adjustment may be needed, to compare two different timestamps.

At block 506, a time-difference between the first and second zero-crossings is determined. The time-difference may indicate that one node or metering device has a phase of electrical power that is leading, the same as, or lagging the phase of a different metering device.

At block 508, a phase difference is determined. The determination may be based at least in part on the time-difference between the zero-crossings of two metering devices. The time-difference may be a positive or a negative $\frac{1}{180}$ of a second (assuming a 60 Hz-based power grid) or zero time-difference (assuming the devices are attached to a same phase of power).

Techniques for determining the time-difference and phase-difference between the zero-crossings of different electricity meters are discussed in FIGS. 3 and 4. The techniques of either figure may be used to perform the actions of blocks 506 and/or 508.

At block 510, a network topology may be generated. The phases may be named (e.g., A, B and C), and groups of metering devices may be associated with each named phase of power.

At block 512, a load of each phase (e.g., phases A, B and C) may be balanced, based at least in part on the network topology. Thus, phases that are more heavily burdened by load, number and size of transformers, and number and load of metering devices, may be unburdened by moving some of the load to other phases. Accordingly, the electrical grid may be operated more efficiently and safely using a balanced load on the phases, which may be based on the knowledge of network topology.

Figure 6:
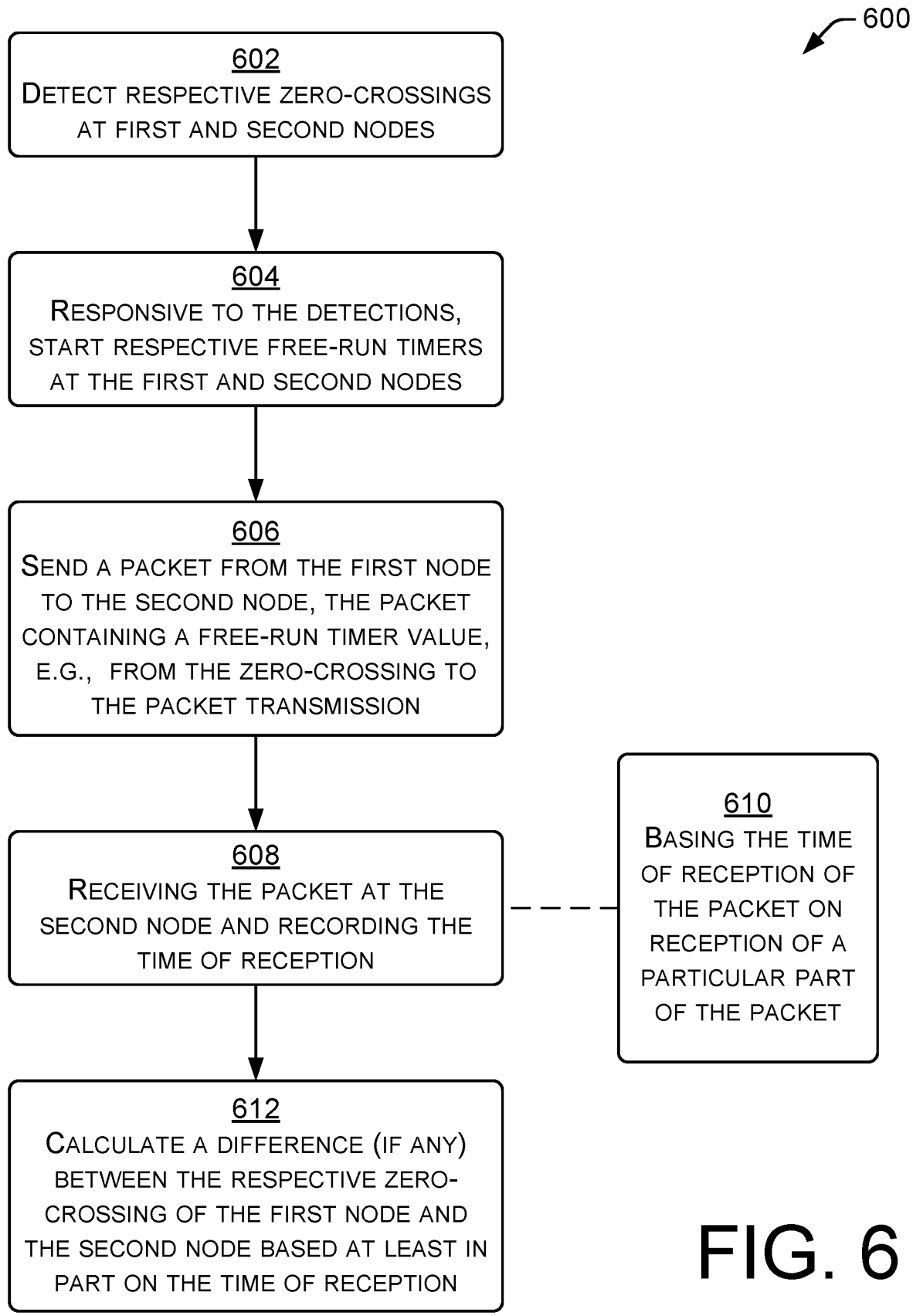
FIG. 6 is a flowchart showing first example techniques for determining electrical phases of nodes, wherein free-run timers on two or more nodes time a period between their respective zero-crossing until the transmission and/or reception of a beacon containing one node's time from zero-crossing to transmission.

FIG. 6 shows first example techniques 600 for determining an electrical phase or phase-difference between nodes. Accordingly, the techniques provide detail for block 508 of FIG. 5. In the example, free-run timers on each of two or more nodes time a period between a respective zero-crossing and a transmission and/or reception of a beacon containing one node's time from zero-crossing to transmission. Comparison of the timers shows differences (if any) between zero-crossing events at two or more nodes. Such differences allow for phase-determination and for network topology determination. Knowledge of network topology supports techniques that increase network efficiency, lower costs, and reduces wear and tear on components.

At block 602, each of a first node and a second node detects/recognizes a zero-crossing of electricity provided by a respective transformer of each node. The zero-crossings may occur at the same time or at different times. In the example of FIG. 1, nodes 106 and 108 are attached the same transformer 128, and would accordingly have zero-crossings at the same time, as indicated by phase 128 of electrical power provided by substation 120. In contrast, nodes 106 and 110 would have zero-crossings at different times, since they are attached to different phases, i.e., phase 122 and phase 124. In the example of FIG. 3, two nodes having voltage phase representations 302, 304 may detect zero-crossings 308, 310 at times 314, 316, respectively.

At block 604, responsive to detection of a respective zero-crossing event, each of the first node and the second read their respective free-run timers. If the nodes are attached to the same phase, the timers would be read at the same time. If the nodes are attached to different phases, the timers would be read at different times. In the example of FIG. 3, the free-run timer of a first node is used to time period 322, following a zero-crossing 308 at time 314. A free-run timer of a second node is used to time period 324, following the zero-crossing 310 at time 316.

At block 606, responsive to the zero-crossing the first node prepares and sends an RF packet containing an elapsed time from zero-crossing to the transmission. In the example of FIG. 3, responsive to the zero-crossing 308 at time 314, the first node may prepare packet for RF transmission at time 320. The first node would include the time 322 (as determined by the free-run timer of the first node) from zero-crossing to a time of transmission of the packet.

At block 608, the second node receives the packet and records the time of reception. These two events allow calculation of the time from the zero-crossing of the second node to packet reception by the second node. In the example of FIG. 3, the elapsed time 324 may be calculated using the time of the zero-crossing of the second node 316 and the time of packet reception 320 by the second node.

At block 610, the time of reception may be based on the start, middle or end of the packet. Basing the time of reception on the start of the packet may be problematic, if the packet is not immediately recognized. In the example of FIG. 3, the time of reception 342 is the end of the preamble 334 and start of the packet header 336. However, the time of reception could be set at the end of the header 336 or the end of the data payload 340.

At block 612, a time-difference between the zero-crossing of the first node and the zero-crossing of the second node is calculated. In the example of FIG. 3, the different 326 shows that the zero-crossings of the nodes are different, and that zero-crossing 308 leads zero-crossing 310 by 120-degrees.

Figure 7:
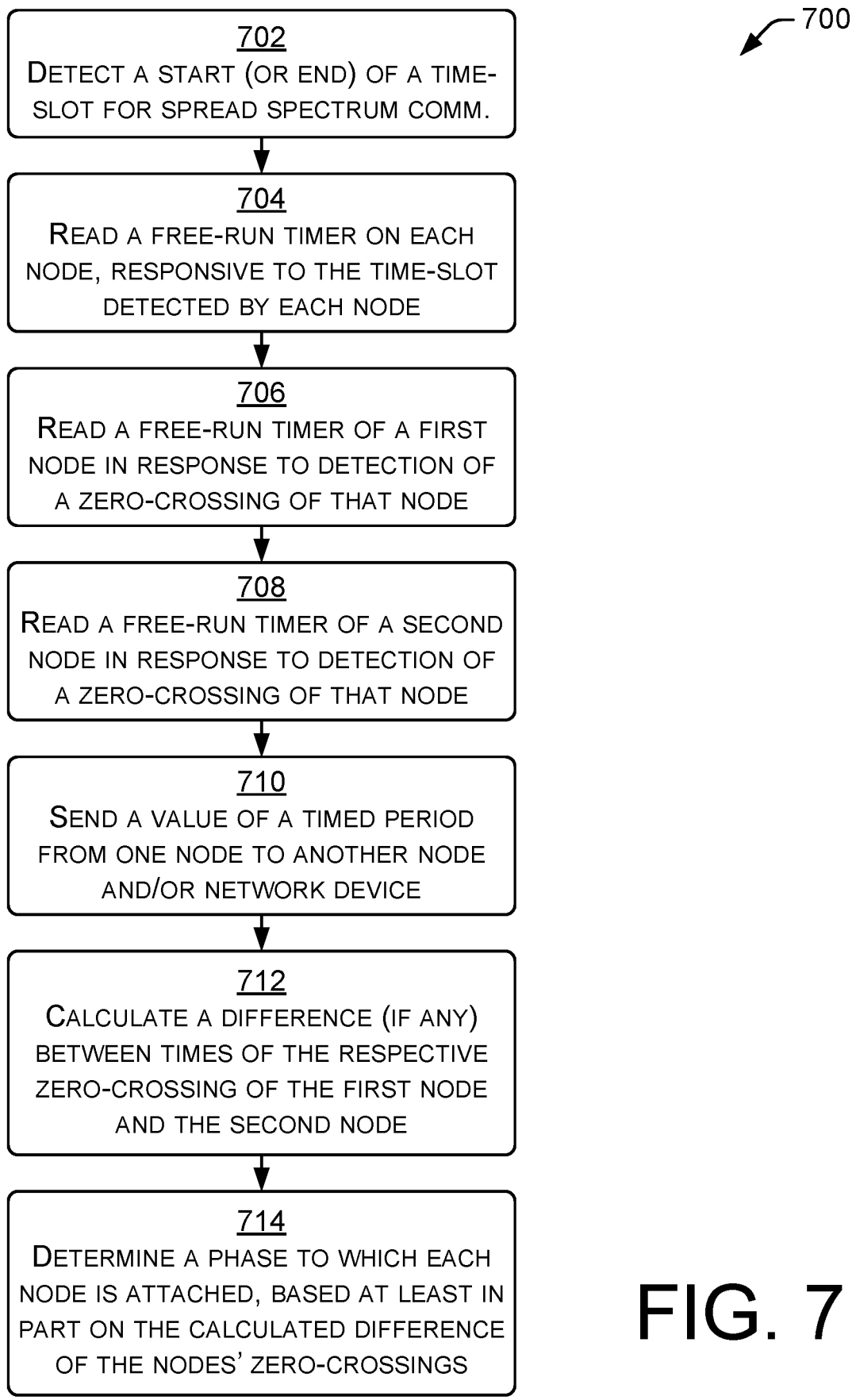
FIG. 7 is a flowchart showing second example techniques for determining electrical phases of nodes, wherein free-run timers on two or more nodes time a period between a beginning (or end) of a spread spectrum time-slot and a zero-crossing event of each respective node.

FIG. 7 shows first example techniques 700 for determining an electrical phase or phase-difference between nodes. Accordingly, the techniques provide detail for block 508 of FIG. 5. The techniques provide a second example for determining electrical phases of nodes, wherein free-run timers on two or more nodes time a period that begins (or ends) at a spread spectrum time-slot and ends (or begins) at a zero-crossing event of each respective node.

At block 702, first and second nodes recognize and/or detect a start (or end) of time-slot and/or transition from one time-slot to another time-slot. In the example of FIG. 4, the time-slot transitions at time 420.

At block 704, responsive to the recognized time-slot, the first and second nodes read values of free-run timers. The values timestamp the spread spectrum frequency-shift time and/or event. In the example of FIG. 4, the first and second nodes begin to time the time-periods 422, 424, respectively.

At block 706, the first node reads its free-run timer responsive to a zero-crossing of the electricity incoming to the first node from an associated transformer. Referring to the example of FIG. 4, the first node has a zero-crossing 408 at time 414. Accordingly, the first node concludes the time period 422. The time period 422 therefore extends from the time-slot event 420 and stops at the zero-crossing event 414. In an alternative example, the events used to time the period could be reversed.

At block 708, the second node reads its free-run timer responsive to a zero-crossing of the electricity incoming to the second node from an associated transformer. Referring to the example of FIG. 4, the second node has a zero-crossing 410 at time 416. Accordingly, the second node concludes the time period 424. The time period 424 therefore extends from the time-slot event 420 and concludes at the zero-crossing event 416. In an alternative example, the first and second events used to time the period could be reversed.

At block 710, one of the timed values 422, 424 may be sent by one node to the other node.

At block 712, a time difference between the timed-periods 422, 424 may be calculated. In the example of FIG. 4, the difference is the time period 426, which represents the difference in time between the zero-crossings 408, 410.

At block 714, the calculated time difference may be used with the network frequency (e.g., 60 Hz) to determine an offset (if any) between the phases of the first and second nodes. In the example of FIG. 4, the offset is 120-degrees.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   obtaining first data, at a processor of a first metering device and from a metrology unit of the first metering device, indicating a first zero-crossing of the first metering device at a first time;
   sending, from a second metering device, a packet comprising second data indicating a second zero-crossing to a powerline communication (PLC) process and to a radio frequency (RF) process;
   obtaining, at the first metering device, the packet comprising the second data indicating the second zero-crossing of the second metering device at a second time, wherein the packet comprises a free-run timer value defining a period between the second zero-crossing until a time of transmission of the packet;
   recording, at the first metering device, a time of reception of the packet, the time of reception being based on the reception of a middle portion of the packet;
   determining, by operation of the processor of the first metering device, a time-difference between the first zero-crossing and the second zero-crossing, wherein the time-difference is based at least in part on the first data and the second data and the time of reception of the packet; and
   determining, by operation of the processor of the first metering device, a phase difference between the first zero-crossing and the second zero-crossing based at least in part on the determined time-difference.

2. The method of claim 1, wherein:
   the second data is obtained from a message sent to the first metering device by the second metering device.

3. The method of claim 1, wherein determining the time-difference comprises:
   determining a first time-difference between a start time or an end time of a time-slot of a spread spectrum RF transmission scheme and the first zero-crossing; and
   determining a second time-difference between the start time or the end time of the time-slot and the second zero-crossing.

4. The method of claim 1, wherein the time-difference is based at least in part on:
   a first value of a first free-run timer on a first device representing a first elapsed time from the first zero-crossing to a start time of a time-slot or an end time of the time-slot of a spread spectrum RF transmission scheme; and
   a second value of a second free-run timer on a second device representing a second elapsed time from the second zero-crossing to the start time of the time-slot or the end time of the time-slot of the spread spectrum RF transmission scheme.

5. The method of claim 1, wherein:
   the time-difference is based on a start time of a time-slot and not on an end time of the time-slot of a spread spectrum RF transmission scheme.

6. The method of claim 1, additionally comprising:
   generating a network topology comprising at least a first transformer powered by current having a first electrical phase and the first zero-crossing and a second transformer powered by current having a second electrical phase and the second zero-crossing; and
   balancing a load of the first electrical phase with a load of the second electrical phase based at least in part on the network topology.

7. The method of claim 1, wherein:
   the first zero-crossing is measured at a first electricity meter;
   the second zero-crossing is measured at a second electricity meter; and
   the phase difference is either +120 degrees, −120 degrees, or zero degrees.

8. A network, comprising:
   a first metrology unit of a first network node to obtain first data indicating a first zero-crossing at a first time;
   a second metrology unit of a second network node to obtain a packet comprising second data indicating a second zero-crossing at a second time and to send zero-crossing information to a powerline communication (PLC) process and to a radio frequency (RF) process; and
   a processor of the first network node to:
      obtain the packet comprising the second data, the packet comprising at least one free-run timer value defining a period between the second zero-crossing until a time of transmission of the packet;
      record, at the first network node, a time of reception of the packet, the time of reception being based on the reception of a middle portion of the packet; and
      determine a time-difference between the first zero-crossing and the second zero-crossing, wherein the time-difference is based at least in part on:
         the first data, the second data and the time of reception of the packet; and
         a first value of a first free-run timer of a first device and a second value of a second free-run timer of a second device;
   wherein the processor of the first network node is configured to determine a phase difference between the first zero-crossing and the second zero-crossing based at least in part on the determined time-difference.

9. The network of claim 8, wherein the time-difference is based at least in part on:
   an adjustment of at least one of the first time and the second time to compensate for time required to move through one or more network layers.

10. The network of claim 8, wherein the time-difference is based at least in part on:
    a time-slot of a spread spectrum radio frequency transmission scheme.

11. The network of claim 8, additionally comprising:
    starting or ending a timer based on a time-slot used in a spread spectrum RF transmission scheme.

12. The network of claim 8, wherein:
    the first zero-crossing is measured at a first electricity meter;
    the second zero-crossing is measured at a second electricity meter; and
    the phase difference is either +120 degrees, −120 degrees, or zero degrees.

13. The network of claim 8, additionally comprising:
generating a network topology comprising at least a first transformer having voltage of a first electrical phase and the first zero-crossing and a second transformer having voltage of a second electrical phase and the second zero-crossing; and
balancing a load of the first transformer with a load of the second transformer based at least in part on the network topology.

14. The network of claim 8, wherein:
the first zero-crossing and the second zero-crossing are based on a first electrical phase and a second electrical phase, respectively, that are offset by 120 degrees; and
the network balances a load of the first electrical phase and a load of the second electrical phase.

15. One or more non-transitory computer-readable media storing computer-executable instructions that, when executed, cause one or more processors to perform acts comprising:
sending, at a first network node, zero-crossing information to a powerline communication (PLC) process and to a radio frequency (RF) process;
obtaining, at the first network node, first data indicating a first zero-crossing at a first time at the first network node;
obtaining, from a second network node, a packet comprising second data indicating a second zero-crossing at a second time, the packet comprising a free-run timer value defining a period between the second zero-crossing until a time of transmission of the packet;
recording, at the first network node, a time of reception of the packet, the time of reception being based on the reception of a middle portion of the packet;
determining, by operation of a processor of the first network node, a time-difference between the first zero-crossing and the second zero-crossing, wherein the time-difference is based at least in part on the first data and the second data and the time of reception of the packet; and
determining, by operation of the processor of the first network node, a phase difference between the first zero-crossing and the second zero-crossing based at least in part on the determined time-difference.

16. The one or more non-transitory computer-readable media of claim 15, wherein the acts additionally comprise: starting or ending a timer based on a time-slot used in a spread spectrum RF transmission scheme.

17. The one or more non-transitory computer-readable media of claim 15, wherein:
a first value of a first free-run timer on a first device represents a first elapsed time from the first zero-crossing to a start time of a time-slot or an end time of the time-slot of a spread spectrum RF transmission scheme;
a second value of a second free-run timer on a second device represents a second elapsed time from the second zero-crossing to the start time of the time-slot or the end time of the time-slot of the spread spectrum RF transmission scheme; and
the time-difference is a difference between the first value and the second value.

18. The one or more non-transitory computer-readable media of claim 15, wherein:
determining the time-difference is based at least in part on a first value of a first free-run timer on a first device, a second value of a second free-run timer on a second device, and a start time of a time-slot or an end time of the time-slot of a spread spectrum RF transmission scheme.

19. The one or more non-transitory computer-readable media of claim 15, wherein:
the first zero-crossing is measured at a first electricity meter;
the second zero-crossing is measured at a second electricity meter; and
the phase difference is either +120 degrees, −120 degrees, or zero degrees.

20. The one or more non-transitory computer-readable media of claim 15, wherein the acts additionally comprise:
generating a network topology comprising at least a first transformer powered by current having a first electrical phase and the first zero-crossing and a second transformer powered by current having a second electrical phase and the second zero-crossing; and
balancing a load of the first transformer with a load of the second transformer based at least in part on the network topology.

* * * * *